Mar. 3, 1925.
A. MACLACHLAN
METHOD OF TREATING WASTE ORGANIC MATTER
Filed July 28, 1920
1,528,380
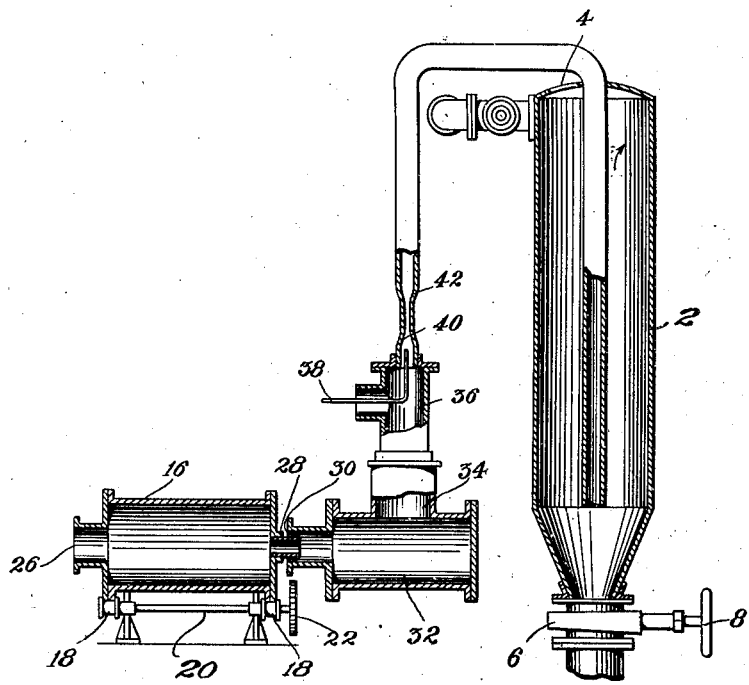
Inventor
Angus Maclachlan.
By his Attorney
H. Dorsey Spencer Patented Mar. 3, 1925.

1,528,380

UNITED STATES PATENT OFFICE.

ANGUS MACLACHLAN, OF PERTH AMBOY, NEW JERSEY, ASSIGNOR TO MACLACHLAN REDUCTION PROCESS CO., OF NEW YORK, N. Y., A CORPORATION OF DELAWARE.

METHOD OF TREATING WASTE ORGANIC MATTER.

Application filed July 28, 1920. Serial No. 399,588.

*To all whom it may concern:*

Be it known that I, ANGUS MACLACHLAN, a citizen of the United States, residing at Perth Amboy, New Jersey, have invented certain new and useful Improvements in Methods of Treating Waste Organic Matter, of which the following is a clear, full, and exact description.

My invention relates to a process of treating waste organic matter, such as garbage, slaughter house waste and the like, and among the objects of the invention are the more thorough and economic separation of the grease from the other constituents of such waste organic matter, the consequent recovery of a much larger portion of the grease than has been heretofore possible, and the production of a grease which is extremely pure and which is substantially free of fatty acids.

A further object is to reduce the time consumed in treating waste organic matter of various sorts, and to prevent any obnoxious odors from being formed during the treatment.

This application is a continuation both of my application Ser. No. 263,814, filed November 23, 1918, and of my application Ser. No. 302,243, filed June 6, 1919, as to common subject matter.

One of the advantages of my improved method resides in the fact that very few, if any, changes need be made in the devices which are in present use for this general purpose, especially in slaughter houses and fertilizer plants. Prior modes of treatment usually consist in a preliminary cooking with steam or digesting of the waste organic substances to be reduced followed by drying, or pressing and drying of the substances. With this mode of treatment, however, on account of the fact that such a large quantity of grease remained in the resulting cake, after being pressed, degreasing was necessary by treatment with naphtha or similar substances. By my improved process, a larger quantity of grease is produced, the grease is of a much better and purer quality and nearly white in color, is substantially free from fatty acids, and the residue dries out with great readiness, forming a fluffy mass practically free from grease and also odorless. Furthermore, the time required with my improved process is very much less than that required by methods now in use.

In my applications referred to, I have described a method of treating waste organic substances with an oxidizing gas such as sulphur dioxide, and the present method may include some of the steps described in these prior applications. It will be obvious, however, that some of the steps described in the present application may be used as preliminary to some of the steps described in said prior applications.

An important feature of the present invention relates to the treatment of the waste organic matter in the green state directly by the oxidizing gas for the purpose of causing a separation of the water, dirt and fatty acid forming substances from the oily constituents of such matter. The water, dirt and fatty-acid-forming substances are heavier than the oily ingredients of the tank and fall to the bottom thereof as a precipitate. As suggested, this feature of the invention may be utilized by itself, or as a preliminary step in the treatment of the waste matter prior to cooking or other further treatment. By this preliminary treatment with the oxidizing gas, however, it results that a great deal of the water is removed more quickly than by the method of cooking. There is also less danger of fatty acids being formed. As in my prior applications, the oxidizing gas which I prefer to use is sulphur dioxide, and this may be introduced in any suitable manner into the substances to be treated, and for this purpose I prefer to employ steam.

In order to show more clearly how my improved process is carried out in practice I have shown, more or less diagrammatically, an apparatus suitable for this purpose.

Referring to the drawings, 2 indicates a tank which may be of any suitable construction, and said tank may be that which is usually used for cooking or digesting waste organic matter, or it may be of special construction. The matter may be introduced into the tank at the opening 4 at the top. An opening near the bottom of the tank may be closed by a valve 6, controlled by a hand wheel 8.

When the tank has been sufficiently charged with matter to be treated, I introduce therein the oxidizing gas, and I prefer to use sulphur dioxide for this purpose. This may be introduced under pressure, or may be drawn through the waste matter. The sulphur dioxide may be formed by burning sulphur in contact with air. In the drawings I have shown a cylinder 16, which is supported at its two ends by grooved rollers 18 and also at its lowest point. Connected with the axis 20 of these rollers is a gear member 22 which is connected to a motor, whereby the cylinder 16 is caused to slowly rotate. Crude sulphur is introduced into the cylinder and ignited, air being supplied abundantly through the opening 26. The end of the cylinder opposite the opening 26 has a reduced portion 28 which projects into a larger opening 30 in a chamber 32 into which the gases enter on their way to the tank 2. The portion 28 is smaller than the opening 30, so that air freely enters the chamber 32 and the sulphur is completely oxidized within said chamber. This chamber may be of T-shape, as shown, having an upper opening 34 into which fits the lower portion of a T member 36. A steam pipe 38 passes into the chamber 36 and, as shown, terminates near the point 40 in a conveyor pipe 42, this conveyor pipe being slightly reduced in diameter at 40. Steam acts to aspirate the $SO_2$ gas generated in the chambers 16 and 32, and a mixture of steam and $SO_2$ passes into the tank 2 and through the contents thereof, the pipe entering the tank passing down and terminating near the lower portion thereof.

My improved process consists in subjecting the tank contents in its raw or green state, with or without the addition of water, to the action of $SO_2$ for a sufficient time to cause separation of water, dirt or other materials, and especially such materials which from experience have been found to contribute largely to the production of fatty acids if allowed to remain mixed with the organic matter. After sufficient treatment, the water and other substances which have been precipitated are drawn off through the opening in the bottom of the tank, or removed in any other desired manner.

At this stage in the process, the residue in the tank may, if desired, be pressed to remove the grease and then dried in any well known way; but instead of removing the residue from the tank at this stage in the treatment, I prefer to add further waste matter to the tank contents and subject the same to further treatment with $SO_2$ for a sufficient time to cause further precipitation of water, dirt, and other substances from the more oily constituents of the organic matter and this precipitate again drawn off. The foregoing steps of the process may be repeated as many times as desired, and until the tank is substantially full of comparatively solid matter. By this means saving in tankage space is effected.

This more or less solid matter, which has been freed of a very large proportion of water, dirt and particularly the fatty acid-forming substances, may be subjected to drying or to pressing, or both, or to any further desired treatment, or to a cooking or digesting process such as is commonly employed. Such cooking is well known and consists usually in introducing live steam into the tank. After the digesting and cooking step has been completed, if this step is taken, the tank contents is again subjected to the action of $SO_2$, and steam—for a sufficient time to cause practically a complete separation of the grease—still remaining in the waste matter. Any further precipitate may be drawn off, and the tank contents subjected to further treatment as desired. Such further treatment may consist in drying, filtering or pressing, either alone or in any combination. During the drying process, when this step is taken, dry $SO_2$ may be used as described in my application Ser. No. 302,243.

Variations may be resorted to within the scope and spirit of my invention, and some of the steps of the process may be used without others.

Having thus described my invention, what I claim and desire to secure by Letters Patent is:

1. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, treating said residue with $SO_2$ after cooking, drawing off any further precipitate, and subjecting the residue to pressure to remove the grease.

2. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, and treating said residue with $SO_2$ after cooking.

3. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, treating said residue with $SO_2$ after cooking, and drawing off any further precipitate.

4. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, treating said residue with $SO_2$ after cooking, and subjecting the same to pressure to remove the grease.

5. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, treating said residue with $SO_2$ after cooking, drawing off any further precipitate, and subjecting said residue to pressure to remove the grease.

6. The method of treating waste organic matter, which consists in subjecting said matter in a suitable receptacle to the action of $SO_2$ for a sufficient time to cause a separation of the water and other heavier substances from the other constituents of the organic matter and drawing off the precipitate thus formed, subjecting the residue after cooking to the further action of $SO_2$ to cause the further separation of grease.

7. The method of treating waste organic matter, which consists in subjecting said matter in a suitable receptacle to the action of $SO_2$ for a sufficient time to cause a separation of the water and other heavier substances from the other constituents of the organic matter and drawing off the precipitate thus formed, subjecting the residue after cooking to the further action of $SO_2$ to cause the further separation of grease, and subjecting the tank contents to pressure to remove the grease.

8. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, and treating said residue in the receptacle to cooking, and treating said residue with $SO_2$ after cooking.

9. The method of treating waste organic matter, which consists in subjecting said matter in a suitable receptacle to the action of $SO_2$ for a sufficient time to cause a separation of the water and fatty-acid-forming substances from the other constituents of the organic matter, drawing off the precipitate thus formed, subjecting the residue in the receptacle to cooking, treating said residue with $SO_2$ after cooking, drawing off any further precipitate, and subjecting the residue to pressure to remove the grease.

Signed at New York city, N. Y., this 14th day of June, 1920.

ANGUS MACLACHLAN.